Sept. 17, 1963     R. L. JAESCHKE     3,103,826
ELECTRICAL SHIFT CONTROL SYSTEM FOR A TRANSMISSION
Filed June 27, 1960     2 Sheets-Sheet 1

INVENTOR.
RALPH L. JAESCHKE
BY
Woodhams, Blanchard and Flynn
ATTORNEYS

United States Patent Office 3,103,826
Patented Sept. 17, 1963

3,103,826
ELECTRICAL SHIFT CONTROL SYSTEM FOR A TRANSMISSION
Ralph L. Jaeschke, Kenosha, Wis., assignor, by mesne assignments, to Eaton Manufacturing Company, Cleveland, Ohio, a corporation of Ohio
Filed June 27, 1960, Ser. No. 39,064
20 Claims. (Cl. 74—339)

This invention relates to a shift control system for a transmission and it relates particularly to electrical shift initiating apparatus effective for initiating a shift at a predeterminable time ahead of the moment of exact synchronization of the parts being interengaged by the shift.

In the application of Perkins et al., Serial No. 569,503, filed March 5, 1956, assigned to the same assignee as the present invention, now Patent No. 2,943,502, issued July 5, 1960, there is set forth a novel concept of providing means initiating a shift of a transmission at a point in time slightly ahead of the point of exact synchronization of the parts being interengaged by the shift and illustrative embodiments for this purpose are set forth in said application.

As discussed in detail in the aforesaid application, there is considerable difficulty in effecting a smooth and rake-free shift under conditions of low speed and high load, such as in earth moving equipment or in very heavy trucks, in that a measurable amount of time is required after a shift signal is given for the mechanical parts to respond to said signal to commence movement and still more time is required for such parts even after movement is commenced to move to the point where the interengageable parts actually commence interengagement. While such movement may require only a small fraction of a second to take place after the initiation thereof, nevertheless when, as often happens, the interengageable parts about to be engaged are changing relative speeds with respect to each other at a rate of several hundred r.p.m. per second, a lag of only a small fraction of a second is ample time to permit a change in relative rotational speeds of said interengageable parts of a magnitude sufficient to affect materially the success of a shifting operation. Thus, in order to insure that the interengageable parts are rotating at equal, or substantially equal, speeds at the moment of interengagement thereof, the foregoing-mentioned application provided for effecting the signal for such interengagement at a point in time slightly ahead of the movement at which actual synchronization occurs. Since a more detailed and extensive discussion of the purposes and advatages of obtaining a shifting signal ahead of the moment of exact synchronization is set forth and discussed at length in the above-designated application, further detailing here is unnecessary and will be omitted.

The apparatus set forth in said application has worked satisfactorily through extensive testing but as a result of said testing certain points appeared at which improvement seemed possible and desirable. Particularly, it has seemed desirable to provide means of greater simplicity than the means set forth in said application and at the same time to provide means of greater versatility. In particular, it has seemed desirable for manufacturing purposes to provide a control unit which can be made to a single set of specifications and which can then, by easily provided modifications, be adapted for use with transmissions having a considerable variety of different gear ratios.

While the problems giving rise to the present invention have developed in connection with automotive transmissions, particularly heavy duty transmissions, and it is therefore convenient for descriptive purposes to refer herein to the application of the invention to automotive transmissions, both on-highway and off-highway, it will be understood that apparatus embodying the invention may be usefully applied to a variety of other situations wherein shiftable toothed elements are employed, such as in automotive two-speed axles, hoisting machinery drives, rolling mill drives and any other location where the shifting of shiftable toothed members is to be effected under conditions of low speed and heavy loads. Therefore, the following discussion in terms of automotive transmissions will be recognized as illustrative only and not limiting.

Accordingly, the objects of the invention are:

(1) To provide shift initiating apparatus for initiating the shifting of a plurality of shiftable gear groups which apparatus will be sensitive to the relative speeds of the gear groups concerned and capable of initiating a shifting operation ahead of the point of exact synchronization, and doing so regardless of whether an upshift or downshift operation is involved.

(2) To provide apparatus, as aforesaid, which will itself sense the occurrence of an upshift or a downshift and will give the correct signal without assistance from an operator.

(3) To provide apparatus, as aforesaid, in which no moving parts are required to adapt the apparatus to give an upshift or a downshift signal.

(4) To provide apparatus, as aforesaid, in which the majority of the parts can be manufactured according to a standard specification and wherein only a single part, or at the most, only a few parts will need modification for adapting the control apparatus to use with transmissions having respectively a variety of different shift ratio characteristics.

(5) To provide apparatus, as aforesaid, having a much greater structural simplicity than previously-known apparatus for the same purpose.

(6) To provide apparatus, as aforesaid, having largely electrical components for sensing the relative speeds of the parts to be interengaged.

(7) To provide speed-sensing apparatus, as aforesaid, which can be connected at a substantial distance from the gear-shifting apparatus without inconvenience and without complicating either the speed-sensing apparatus or the problems of its installation.

(8) To provide apparatus, as aforesaid, which will be relatively economical in its original manufacture and equally economical in its maintenance requirements.

(9) To provide apparatus, as aforesaid, wherein the amount by which the shifting signal is given ahead of the point of exact synchronization may be readily modified merely by changing either or both of only two readily replaceable components.

Other objects and purposes of the invention will be apparent to persons acquainted with equipment of this general type upon reading the following specification and inspection of the accompanying drawings.

*General Description*

In general, the invention comprises a control system in which the input and output shafts of a transmission drive, respectively, a pair of voltage-generating devices whose voltage outputs are each lineally proportional to the respective rates of rotation of said input and output shafts. These respective voltage outputs are then supplied to balance circuitry which includes means for compensating for the difference in rates of speed of the input and output shafts of the transmission when the transmission is in its various gear ratios. So long as there is an unbalance between the voltages supplied by the voltage-generating devices to the balancing circuit no signal is given and no shift occurs. As soon as balance is obtained, however, a suitable signal is given by the balancing circuit and a shift is initiated. Anticipating means are provided in association with said balance circuitry by which electrical balance is achieved slightly ahead of mechanical synchronization of the parts being interengaged.

In the particular preferred embodiment here utilized to illustrate the invention, the anticipating means comprises an R-C circuit serially connected to the balance circuit. The balancing circuit includes a a resistance across which the output voltages of the voltage-generating devices are placed in opposition to each other. The output from said resistance, if any, is utilized as above set forth in connection with the above-mentioned signal.

*Detailed Description*

While the control circuitry of the present invention is applicable to a wide range of specific transmissions and transmission shifting mechanisms, it will be convenient for the purposes of illustration to describe said control circuitry in connection with one particular illustrative transmission and transmission-shifting apparatus. Therefore, for the purpose of insuring a complete understanding of the invention, a particular transmission and transmission-shifting apparatus is schematically illustrated in the accompanying drawings and will be briefly described hereinafter. A more complete illustration and description of a transmission to which the present invention is applicable, and of which the illustration in FIGURE 1 of the drawings is a relatively simple representation, will be found in U.S. Patent No. 2,637,221. A detailed description of a closely related transmission control system will be found in the application of McNamara and Perkins, Serial No. 714,191, assigned to the present assignee, now Patent No. 2,943,719, issued July 5, 1960. However, the present hydraulic system described herein is a simplification and improvement of the system disclosed in said Serial No. 714,191 and is in many respects a substantial improvement thereover.

*Transmission Structure*

For the purpose of convenience in reference, the terms "upwardly," "downwardly," "rightwardly," and "leftwardly" and derivatives thereof and words of similar import will be freely used to indicate directions taken with respect to the drawings. Such terminology will be solely with respect to the drawings and will have no other significance.

Figures 1, 2:
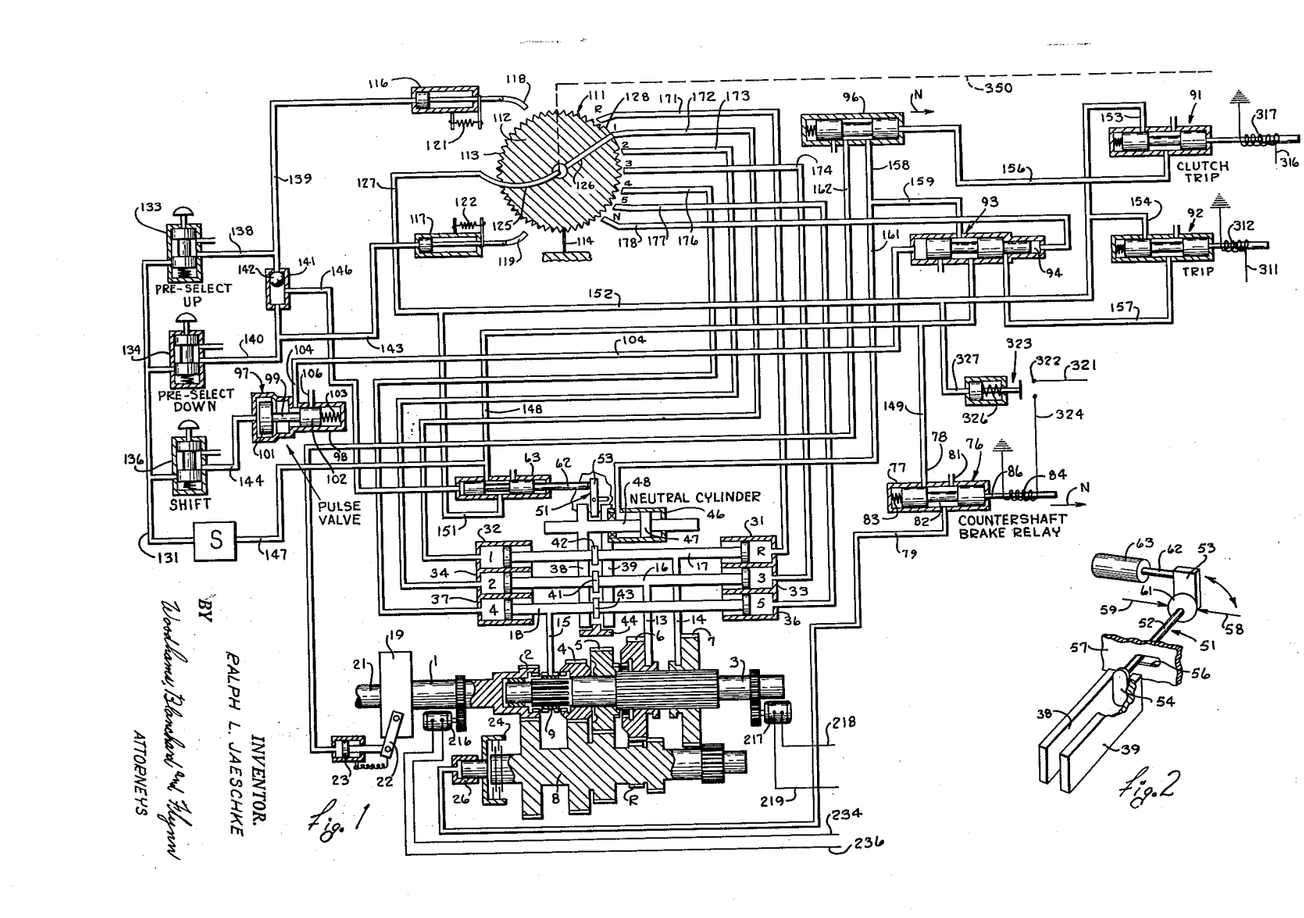
FIGURE 1 is a schematic representation of a typical transmission with which the control apparatus of the invention may be used, together with a schematic representation of typical pressure-fluid circuitry used with the invention.
FIGURE 2 is an oblique schematic view of one of the parts.

An input shaft 1 drives input gear 2 and the output shaft 3 is driven from a plurality of gears, 4, 5, 6 and 7. A countershaft 8 is constantly driven from the input gear 2. The gears 6 and 7 and the splined sleeve 9 are selectively moved by any convenient shift-effecting apparatus, such as shift forks 13, 14 and 15 operating on and as a result of movement of the usual shift rods 16, 17 and 18.

A clutch 19 is provided between the input shaft 1 and a power source shaft 21 in the usual manner. Said clutch is operated by the usual lever 22 from a cylinder 23.

The countershaft 8 is operatively connected to a countershaft brake 24 of conventional type which is actuated in an already well-known manner by a pressure fluid cylinder 26.

A plurality of pressure fluid cylinders is provided for actuation of the shift rods 16, 17 and 18. A cylinder 31 is provided which upon energization will move the shift rod 17 leftwardly and a cylinder 32 is provided for moving the rod 17 rightwardly. A cylinder 33 is provided for moving the shift rod 16 leftwardly and a cylinder 34 is provided for moving said shift rod 16 rightwardly. A cylinder 36 is provided for moving the shift rod 18 leftwardly and a cylinder 37 is provided for moving the shift rod 18 rightwardly. A pair of neutralizing plates 38 and 39 are suitably perforated to permit said shift rods to pass therethrough and each of said shift rods has respectively the center stops 41, 42 and 43 rigidly affixed thereto. A further stop 44 affixed rigidly with respect to the housing of the shift apparatus is provided for limiting the centerward movement of the neutralizing plates 38 and 39. A neutral cylinder 46 is affixed to the neutralizing plate 39 and the plunger 47 of said cylinder is affixed by suitable means, such as the rod 48, to the neutralizing plate 38.

Thus, movement of any of the shift rods in either direction will move one of said neutralizing plates away from the center stop 44 and energization of the neutral cylinder 46 will move both of said neutralizing plates toward the center stop 44.

*Pressure Fluid System*

Now turning to the pressure fluid system, a description will first be made of the several valves and mechanism utilized therewith and this will be followed by description indicating the manner by which these parts cooperate with each other.

FIGURE 2 shows a crank mechanism 51 which operates in response to movement of the neutralizing plates 38 and 39. Said crank 51 has a central shaft 52 with a valve crank 53 at one end thereof and a plate crank 54 at the other end thereof. The lower or free end of the plate crank 54 extends between the plates 38 and 39 and is snugly arranged therebetween when said plates are in their full central position. The rod 52 extends through a slot 56 in a wall 57, said wall being a part of the frame of the apparatus. The arrows 58 and 59 schematically indicate bearings acting against the ball 61 for holding said rod in an operable position as hereinafter further described. The plunger 62 of the neutral valve 63 bears against the crank 53.

Thus, when both the neutralizing plates 38 and 39 are in their center position, the crank 53 cannot rotate in either direction and the valve 63 cannot respond to pressure in line 146 (FIGURE 1) by moving into its rightward position. Thus, the valve is held in the position shown in the drawings rather than moving into its exhaust position. However, upon movement of the neutralizing plate 39 rightwardly, the rod 52 is permitted to rotate clockwise around a pivot point provided between the lower end of the crank 54 and the neutralizing plate 38, such movement being permitted by the slot 56. This permits the valve 63, upon pressurizing of the line 146, to move rightwardly into its exhaust position. Restoration of the plates 38 and 39 to their centered positions will return the crank 53 to the position shown in the drawings and return the valve 63 to its leftward position. Movement of the plate 38 leftwardly will permit the lower end of the crank 54 to move leftwardly and thus permit the rod 52 to rotate clockwise. This again permits the crank 53 to move clockwise and the valve 63 to move, in response to the pressurizing of line 146, into its exhaust position. Again the restoration of the neutralizing plates 38 and 39 to their centered positions returns the crank arm 54 to its centered position as shown in the drawings and restores the valve to its leftward position as shown in the drawings.

The brake relay 76 has a housing 77, connections for conduits 78 and 79 connecting thereto, and exhaust 81 and a plunger 82. Said plunger is constantly urged rightwardly by any suitable, resilient, constantly-acting means, such as a spring 83 and may be urged leftwardly by action of the solenoid winding 84 on the rod 86. The clutch trip 91 and the trip relay 92 are both of the same construction as the brake relay 76 and hence need no further description. The relay 93 is of the same construction as the relay 76 excepting that it is actuated by pressure fluid introduced into the chamber 94 instead of by a solenoid and its pressure fluid connections are somewhat different than those used with a brake relay 76 as shown and as will be developed further hereinafter. A further relay 96 is generally similar to the relay 93 with the exception of the connections which will be developed further hereinafter.

The pulse valve 97 comprises a housing 98 having a rod 99 therein, said rod carrying pistons 101 and 102 of different sizes thereon. When the rod 99 responds to the spring 103 and it is in its leftward position as shown, pressure fluid entering through the leftward end of the pulse valve 97 will pass by the piston 101 and out through the conduit 104. So long as there is no back pressure in the line 104, the spring 103 will hold the valve in position as shown. However, as soon as a back pressure develops in said line and the pressure therein increases against the leftward face of the piston 102, this will push the valve rightwardly into its other position. In this position pressure fluid within the line 104 will exhaust through the exhaust opening 106 but pressure from the leftward end of the valve will now act against the leftward face of the piston 101 to hold said valve in its rightward position. The pressure on the leftward side of the piston 101 acts upon a larger surface than the pressure acting on the rightward side of the piston 101 when said valve is in its full rightward position, and hence said valve will remain firmly in its rightward position so long as there is pressure entering the leftward side of said valve.

The three manually operable valves 133, 134 and 136 appearing at the leftward side of the drawing are common, manually operated three-way valves of a standard construction and need no detailed description other than that appearing in connection with the description of the general organization of the apparatus which follows hereinafter.

The selector mechanism 111 comprises a rotor 112 having teeth 113 arranged around its periphery. Any suitable device which is here illustrated as a spring member 114 mounted to the frame of the machine is provided for holding same normally against rotation. Pressure fluid actuated cylinders 116 and 117 are provided with pawls 118 and 119, respectively, and upon energization of the respective cylinders said pawls will engage the teeth of the rotor 112 and move same against the holding tendency of the spring 114. The springs 121 and 122 indicate the presence of a constantly acting resilient force returning said pawls into disengaged position upon release of the energizing of the pressure fluid.

The passageway 125 schematically indicates that the external conduit 127 connected therewith communicates through the interior of the rotor 112 with a distributing passageway 126. Said distributing passageway opens through a land 128 on the periphery of said rotor and upon rotation of said rotor said passageway 126 can be caused to connect with a selected one of a plurality of passageways shown in the drawing as opening adjacent thereto.

Turning now to the pressure fluid connections for said mechanism, a source S of pressure fluid is provided in any convenient manner and may include a reservoir of compressed air supplied and held under pressure by any convenient means, not shown. Said supply S is connected by a line 131 to the inlets of the manually operable valves 133, 134 and 136. Each of said valves is spring biased to be normally closed against the several inlet conduits connecting said valves to the supply line 131. The outlets of each of said valves are normally connected to the exhaust conduits thereof but are connectible to the inlets thereof by depression of the manually operable buttons. The outlet of the upshift preselect valve 133 is connected by a conduit 138 to a further conduit 139 which connects at one end of the leftward end of the actuator 116 and at its other end to a shuttle valve 141. Such shuttle valve provides a housing surrounding a ball 142 which ball moves from the upper to the lower end of the housing, and thereby closes one or the other of the lines connected thereto.

The line 140 from the outlet of the downshift preselect valve 134 connects to the lower end of the shuttle valve 141 and connects further through a line 143 to the leftward end of the other actuator 117. The outlet line 144 of the shift valve 136 connects to the leftward end of the pulse valve 97. The outlet 104 of said pulse valve 97 connects to the leftward end of the relay 93. The middle connection of the shuttle valve 141 connects through a line 146 to the leftward end of the neutral relay 63.

Returning now to the source S, it is further connected by a line 147 to the leftwardmost connection of the valve 63 and is further connected through a line 148 to one of the ports of relay 93. A branch line 149 connects the line 148 to the connection 78 of the brake relay 76.

Returning to the neutral valve 63, its other principal port is connected by a line 151 to the line 127 and is also connected by a further line 152 to the supply lines 153 and 154 of the relays 91 and 92, respectively. The outlet of the relay 91 is connected by a line 156 to the rightward end of the relay 96 and the outlet of the relay 92 is connected by the line 157 to the rightward end of the chamber containing the valve portions of the relay 93.

The relay 96 is connected for its supply by lines 158 and 159 to the relay 93, said line 159 also supplying line 161 which is connected to the neutral cylinder 46. The outlet of the relay 96 is connected by a line 162 to the clutch actuating cylinder 23.

All of the outlet ports of the selector 111, excepting the lowermost thereof, are respectively connected by the lines 171, 172, 173, 174, 176 and 177 to the cylinders 31, 32, 34, 33, 37 and 36. The lowermost or neutral, outlet port is connected by a line 178 to the rightward end of the relay 93.

*Electrical System*

An input generator 216 having a substantially linear voltage output in relation to its speed of rotation is mechanically driven from the input shaft and is caused to maintain an exact speed relationship with the speed of the input shaft. There are many known types of generators suitable for this purpose, including direct current generators, but for mechanical reasons I prefer to use an alternating current generator and one which has a permanent magnet rotor providing a plurality of alternating poles. A similar output generator 217 is mechanically affixed to the output shaft and is arranged so that its speed of rotation bears a precise relationship to the speed of rotation of the output shaft. Normally, but not necessarily, each generator will bear the same relationship between its speed of rotation and that of the shaft with which it is connected as that of the other generator and normally, but again not necessarily, such relationship will be equal. Thus, for purposes of description, hereinafter it will be assumed that each generator operates at the same speed as the speed of the shaft to which it is connected.

The output shaft generator 217 (FIGURE 3) has its output terminals connected to a pair of conductors 218 and 219 which are connected to any convenient rectifying system, here a full wave voltage doubler consisting of the rectifiers 220 and 221 and the capacitors 222 and 223. The conductor 224 is then connected between the junction point 226 and the junction point 270.

Figure 3:
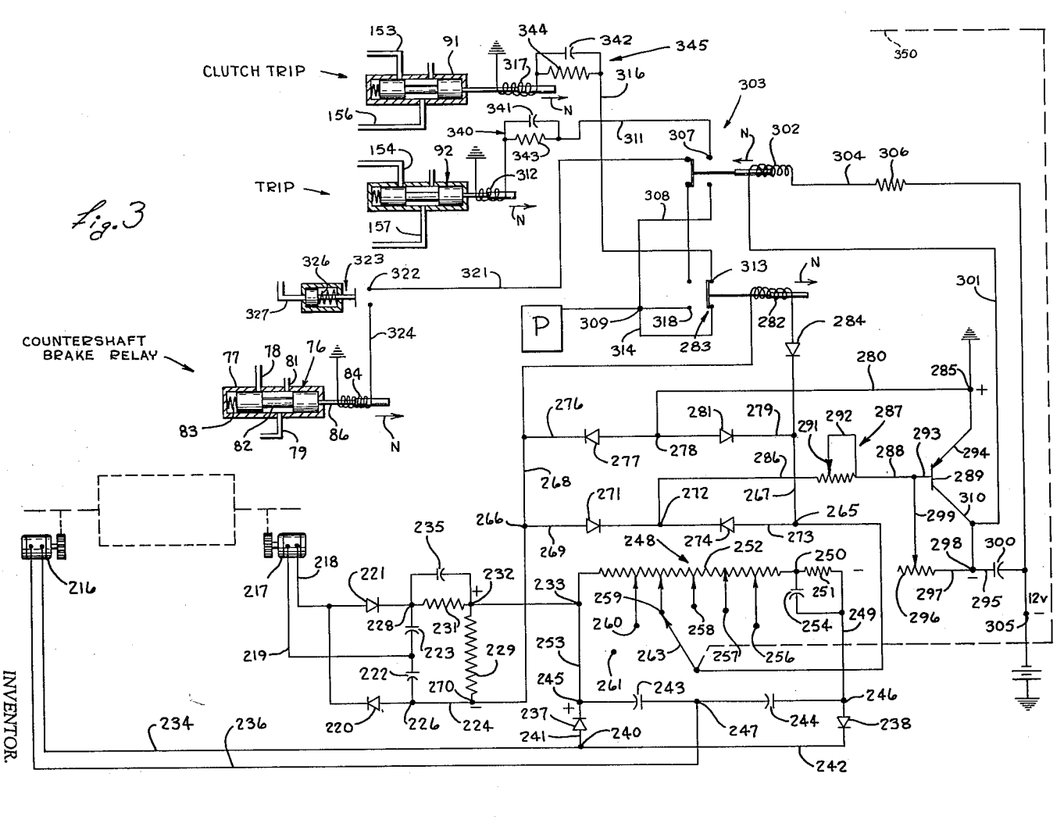
FIGURE 3 is a circuit diagram of electrical circuitry embodying the invention.

The junction point 228 is connected through a resistance 231 to a junction point 232. A resistance 229 is connected between the conductor 224 and the point 232. A capacitor 235 is connected around and parallel with the resistance 231.

The input shaft generator 216 has its output terminals connected to conductors 234 and 236 which are connected to a full wave voltage-doubler. The conductor 234 is connected to a junction point 240 which is then connected through a rectifier 237 by a conductor 241 to the junction point 245. The junction point 240 is connected by the conductor 242 through a rectifier 238 to a junction point 246, said two rectifiers being oppositely poled with respect to each other. The conductor 236 is connected to a junction point 247 which is in turn connected through a capacitor 243 to the junction point 245 and is further connected through a capacitor 244 to the junction point 246. The junction points 246 and 245 thus represent the output terminals for the voltage originating in the input shaft generator 216.

Turning now to the balancing circuit 248, and recognizing that the particular balancing circuit herein set forth is for illustrative purposes only and that other balancing circuits can readily be utilized, the junction point 246 is connected by a conductor 249 to one end of a resistance 251. The other end of said resistance is connected to one end of a tapped resistance 252 whose other end is connected to the junction 233. A conductor 253 connects the junction point 233 with the junction point 245.

The capacitor 254 is connected around the resistance 251 to comprise an R-C circuit which functions as the "anticipator" portion of the balancing circuit, as hereinafter described in more detail. The tapped resistance 252 is then connected to suitable contact points 256, 257, 258, 259 and 260, each of which is selectively contacted by the switch armature 263.

The resistance 251 is in this embodiment equal in value to that of resistance 252, although other ratios may be employed.

Turning now to the interpreting and triggering circuits, there is provided means responsive to a balance or unbalance in potentials between the junction points 265 and 266 and initiating a shift of the shiftable gears when said potentials come into a predetermined relationship, with respect to each other, as into equal balance or within a differential of less than a predetermined value.

In this particular embodiment the junction point 265 is connected to a conductor 267 and the junction point 266 is connected to a conductor 268. A conductor 269 is connected to the conductor 268 and connects through a rectifier 271, sensed rightwardly as appearing in the drawing, to a junction point 272. Another conductor 273 is connected to the conductor 267 and connects through a rectifier 274, sensed leftwardly as appearing in the drawing, to the junction point 272. A conductor 276 is connected to the conductor 268 and connects through a rectifier 277, sensed leftwardly as appearing in the drawing, to the junction point 278. A conductor 279 is connected to the conductor 267 and connects through a rectifier 281, sensed rightwardly as appearing in the drawing, to the junction point 278.

A conductor 280 connects the junction point 278 to the junction point 285 which in turn is connected to ground.

The winding 282 of a switch 283 is connected between the conductors 267 and 268 and in series with a rectifier 284 for controlling the countershaft brake during upshift operations.

A conductor 286 is connected from the junction point 272 to one end of the resistance portion of the variable resistor 287 whose other end is connected by the conductors 293 and 288 to the control portion of an amplifying unit which in this embodiment is the base of a P-N-P type transistor 289 connected in a grounded-emitter type amplifying circuit but which could in other instances be the grid of either a vacuum or a gas-filled electric discharge device. The slider 291 of the variable resistor is connected by conductor 292 to conductor 288. The electronic relay function here performed by the transistor 289 can in other instances where other operating characteristics are required be performed by still other components or by circuitry having the required characteristics.

The positive connection 294 of the electronic relay, here the emitter of the transistor, is connected through point 285 to ground, normally the ground connection of the battery in the automotive device with which the shift mechanism here concerned is being used. A bias for the transistor is provided by the variable resistor 296 whose resistance unit is connected through the conductor 297 and to the junction point 298. The slider of said variable resistor is connected by conductor 299 to a junction point between the conductor 293 and the conductor 288.

The negative side of the electronic relay device, here the collector of the transistor, is connected by conductors 310 and 301 to one end of another relay, here one end of the winding 302 of the relay 303. The other end of said winding is connected by the conductor 304 through a resistance 306 to the other side of the source.

A conductor 295 connects the junction point 298 through a capacitor 300 to the negative side 305 of a suitable D.C. source. Said capacitor 300 is a stabilizing capacitor provided to prevent actuation of a shift-initiating mechanism upon the appearance of transients.

The normally open contacts 307 of the relay 303 are connected at one side by the conductor 308 through the junction point 309 to a source P of electrical potential and the other side of said contacts is connected by the conductor 311 through the circuit 340 comprising the resistance 343 and capacitor 341 to the winding 312 of the relay valve 92 and thence to ground. The normally closed contacts 313 of the relay 283 are connected at one end by the conductor 314 to the junction point 309 and at the other end by the conductor 316 through circuit 345 comprising resistance 344 and capacitor 342 to one end of the winding 317 of the relay valve 91 and the other end of said winding is connected to ground. The normally open contacts 318 of the switch 283 are connected at one end to the junction point 309 and at the other end to one side of the normally closed contacts 319 of the switch 303. The other side of said last-named contacts is connected by the conductor 321 to one side of the normally opened contacts 322 of a pressure switch 323 and the other side of said contacts is connected by a conductor 324 to the winding 84 of the relay valve 76. The other side of said winding is connected to ground. Said pressure switch 323 is normally held open by constantly-acting means such as a spring 326 and is closed by the appearance of a pressure of predetermined value in the conduit 327.

Returning now to the tapped resistance 252, the resistance so provided between the junction point 233 and the junction point 250 will be in increments of resistance which will bear with respect to each other the same ratios as the several transmission ratios bear with respect to each other. Thus, when the selector arm 263 is on contact 256, corresponding to the direct drive position, the voltage originating in the input generator 216 appearing at the junction points 245 and 246 will be compared to the voltage originating in the output generator and appearing at the junction points 270 and 232 in a one-to-one ratio. With this arm 263 in the fourth speed position, namely, on the contact 257, said input and output voltages will be compared to each other at the ratio of the fourth speed gears. Corresponding comparisons may be made as the armature 263 occupies the third, second and first positions, respectively, on contacts 258, 259 and 260, with the contact 261 being utilized when the selector 111 is in its neutral position.

Mechanical coordination between the selector 111 and the armature 263 is effected by any suitable mechanical means schematically illustrated herein by the broken line 350.

Each of the valves or relays 76, 91, 92 and 96 and both of the switches 283 and 303 are mechanically, as resiliently, arranged to occupy a normal, or de-energized, position as shown in the drawings and as further indicated by the arrow "N" alongside each thereof.

Operation

In considering the operation of the apparatus attention will first be given to the operation of the speed-sensing and shift-initiating mechanism and after that attention will be directed toward the operation of the mechanical and pressure fluid mechanism with which said triggering apparatus is used.

Assume first that the apparatus is in first gear position with the armature 263 against the contact 260 and it is desired to effect a shift into second gear position. Taking the first gear ratio at 7.33 to 1 and the second gear position as 4.43 to 1, the ratio of the resistance between points 233 and 250 and the points 233 and 260 will be 7.33 to 1 and the resistance between point 233 and point 250 and the point 233 and point 259 will be 4.43 to 1.

With the apparatus running in first gear, the ratio of the speed of input shaft 1 with respect to the speed of the output shaft 3 is at the ratio of 7.33 to 1 so that the ratio of the voltage outputs from the input generator 216 as compared to the output generator 217 is also at the ratio of 7.33 to 1.

The generator 216, whose output is an alternating potential, acts in a known manner through the rectifiers 237 and 238 and the capacitors 243 and 244 to provide a substantially steady potential at the junction points 245 and 246 which potential is approximately double that of the output potential of the input generator 216. Said potential between the junction points 245 and 246 is applied across the series-connected resistors 251 and 252, said resistors in a preferred embodiment being equal in resistivity to each other.

The output of the output generator 217 is applied through the voltage-doubler circuit consisting of the rectifiers 220 and 221 and the capacitors 222 and 223 to provide a substantially steady voltage at the junction points 228 and 270.

Ignoring for a moment the effect of the R-C circuit consisting of the resistance 231 and the capacitor 235, the voltage at 228 is applied to the junction point 232 and thence to the junction point 233 and is of the same polarity as the voltage applied to the junction point 233 from the junction point 245.

The voltage between junction points 232 and 270 is connected in series with, but of opposing polarity with respect to, the voltage appearing between the armature 263 and the junction point 233, the circuit being traced from point 270 to junction point 266 thence through one of the rectifiers 271 and 277 depending upon the polarity existing between points 266 and 265 as hereinafter discussed, thence through a corresponding one of points 272 and 278, through the amplifying unit represented by the transistor 289 to the other of the points 272 and 278, thence through the appropriate one of the rectifiers 274 and 281 to the point 265, thence to the armature 263 and through a portion of the resistance 252 lying leftwardly of the tap to which said armature is connected to point 233 and thence to the point 232.

With the generators 216 and 217 operating at constant speeds, the resistance 251, being equal to the resistance 252, will reduce the voltage across resistance 252 to one-half of that between the points 245 and 246 and the resistance 231 being equal to the resistance 229, will reduce the voltage between the points 270 and 232 to one-half of that existing between the points 270 and 228.

Still assuming the transmission to be in first gear position, and the voltage from the input generator 216 to be 7.33 times the voltage output generator 217, and that the ratio of resistance between the points 233 and 250 is 7.33 times the resistance between the points 233 and 260, it will be seen that the voltage across the resistor 229 is equal to the voltage across resistor 252 between the points 233 and 260. Since these resistances are in series relationship with each other and are connected in opposite polarity, the voltage between the points 266 and 265 is zero whereby current flow occurs through the system including the transistor 289, and current flows through the winding 282 of the switch 283.

Now assume that the armature 263 is moved to its second gear position, namely, the contact 259 as shown in the drawings. This means that the resistance ratio between the point 233 and the point 259 as compared to the resistance from the point 233 to the point 250 is now 4.43 to 1. Thus, at this instant and before any of the transmission parts have changed their speeds, the voltage from the output generator 217 and appearing across the resistance 229 remains unchanged and the voltage difference between points 233 and 250 originating with the input generator 216 likewise remains unchanged. However, since the voltage difference between points 259 and 233 will be greater than the voltage difference between the point 260 and the point 233 (which latter at the existing speed of the input generator 216 is equal to the voltage appearing across the resistance 229) the voltage between the points 232 and 270 will no longer balance the voltage appearing between the points 259 and 233 and accordingly a potential difference will appear between the points 265 and 266. The magnitude of such potential difference is essentially equal to the difference between the voltage between points 233 and 259 and the voltage across the resistor 229. Inasmuch as the voltage at point 259 is more negative than the voltage at point 260, it will be apparent that the voltage at point 265 will be negative with respect to the voltage at point 266 and the subsequently analyzed operation of the apparatus will proceed accordingly. Thus, an upshift will be characterized by an appearance of potential at point 265 which is negative with respect to the point 266. From this it will be evident that a downshift will be characterized by the appearance of a potential at the point 265 which will be positive with respect to the potential at the point 266. The appearance of an unbalanced potential between the points 265 and 266, will result in current change through the amplifying unit indicated by the transistor 289 in a manner and with results which are described following.

Passage of current through the base-emitter path of said transistor permits current flow from the positive side of the source to junction point 285, through the emitter and collector, respectively, of the transistor 289, then by conductor 301 to and through winding 302 and finally by conductor 304 and resistance 306 back to the negative side 305 of the source. Energizing of the winding 302 shifts the contacts from the position shown in the drawing to the opposite position. Since the transistor is here biased to a normally "on" condition, the switch 303 is in its energized (rightward position) whenever current flows through the base-emitter circuit of the transistor and this occurs whenever there is a balance of potentials between points 265 and 266. When there is an unbalance, then the bias is overcome, current flow in said bias-emitter path stops and the transistor is cut off. Thus, with the initiation of a shifting operation and the consequent unbalance of the potentials between points 265 and 266, the transistor is nonconductive, the winding 302 is de-energized and the switch 303 closes contacts 319.

Similarly, potential between the points 265 and 266 will, the same being in the proper polarity in an upshift to pass rectifier 284 as developed further hereinafter, energize the winding 282 to shift the contacts of the switch 283 and thereby disconnect the relay winding 317 from its normal connection to the source P and to connect the contacts 318.

Because of the arrangement of the rectifiers 271, 277, 274 and 281, the transistor 289 will be cut off regardless of the direction of voltage unbalance between the point 233 and the armature 263. However, when the armature 263 moves clockwise for an upshift, so that the voltage difference appearing between same and point 233 is increasing with respect to the voltage across resistance 229, current will pass the rectifier 284 and thus the winding 282 becomes energized.

Thus, the switch winding 282 is energized and the winding 302 is de-energized as above described and the contacts 318 of the switch 283 and contacts 319 of the switch 303 will both be closed. As soon as the proper pressure appears in the line 327 as hereinafter described and the contacts 322 are closed, the source P will be connected to ground through the winding 84 of the brake relay 76 whereby to apply the countershaft brake during the period of time that the shafts are synchronizing. From this it follows that during an upshift operation the clutch winding 317 becomes de-energized (as shown in the drawing) while the winding 84 of the brake relay 76 is energized for so long as the potentials between the resistance 229 and the point 233 and the armature 263 remain unbalanced. The input shaft 1 of the transmission is now decelerated rapidly which permits a rapid lessening of the voltage difference produced by the input generator 216. This effects a rapid lessening of voltage difference between the points 245 and 246. However, the charged capacitor 254 tends to maintain the previously existing voltage difference between its ends and this will diminish the voltage difference between the point 233 and the point 250, or in effect proportionately reduce that voltage between the points 259 and 233 to a value lower than it would be if it followed solely the diminishing speed of the input generator 216. Thus, the actual voltage between the points 259 and 233 is lower than would normally correspond to a given speed of the input generator 216. Thus, as the generator 216 diminishes in speed and its voltage output correspondingly diminishes, the lowering of the voltage difference between the points 259 and 233 somewhat leads the actual diminishing of the speed of input generator 216. Thus, the balance between the opposing voltages across resistance 229 and across the portion of resistance 252 which is between points 259 and 233 will ultimately be attained as the generator 216 further diminishes its speed and such electrical balance will be attained slightly before the attainment of synchronous speeds between the input shaft 1 and the output shaft 2. When such electrical balance is attained, flow of current in the base-emitter path of the transistor resumes through the transistor 289 but stops through the switch winding 282. Resuming current flow through the transistor will again energize the switch winding 302. Said switches will then both take the rightward positions as shown in the drawing and the relay windings 312 and 317 connected thereto will be activated and the countershaft brake winding 84 will be de-activated.

In the foregoing it has been assumed that the output shaft 3 has continued to operate at a constant speed and such will often be the case where the transmission is used under conditions of relatively high speed or light load. However, where the use is under conditions of low speed and high load, and such is the primary purpose of the equipment embodying the present invention, then the effect of diminishing the speed of the output shaft 3 must be taken into consideration. Here the capacitor 235, being charged, will tend to maintain the previous voltage difference between points 228 and 232. As the output of the generator 217 diminishes in value, the voltage difference between the points 228 and 270 also diminishes. However, with the portion of said voltage difference represented by the voltage across the capacitor 235 tending to remain steady, the portion of said voltage difference appearing across the resistance 229 diminishes at a rate faster than the rate at which the voltage between points 228 and 270 diminishes. Thus, the voltage difference applied between the points 232 and 270 and originating from the output generator 217 is also diminished somewhat more than would otherwise correspond to the speed of said output generator. In this way the overtaking of the input generator voltage appearing between the points 259 and 233 by the output generator voltage opposed thereto and appearing across the resistance 229 is somewhat delayed in a manner corresponding to the delaying of the overtaking by the diminishing input shaft speed of the also diminishing output shaft speed but such overtaking by the electrical representations of the shaft speeds still occurs ahead of the synchronizing of the mechanical parts.

Further upshift sequences follow the same pattern as the sequence from first-to-second positions and will be understood without further explanation.

Turning now to the downshift sequence it will be assumed that the transmission is in second position and the armature 263 is in its second position on the contact 259. With the input and output shafts rotating with respect to each other at speed ratios of 4.43 to 1 and the resistance ratios between the points 233 and 250 and the points 233 and 259 also being a ratio of 4.43 to 1, the system is in balance and current flows through the transistor 289 and winding 302 of the switch 303 (but not through winding 282 of switch 283).

Now assuming that the selector 111 is moved into the first gear position which results in corresponding movement of the armature 263 onto the contact 260, it will be understood that the balance between the voltage existing between the point 233 and armature 263 as compared to the opposing voltage existing between the points 232 and 270 is upset and a flow of current through the transistor 289 is terminated. This in the manner above described will de-energize the winding 302 of the switch 303 with the results derived therefrom as further described hereinafter. However, the polarity of said unbalance will now be such that current flow resulting therefrom will be unable to pass the rectifier 284 and the winding 282 of the switch 283 will remain de-energized. This will energize the winding 317 of the clutch trip relay valve 91 and, as further detailed hereinafter, will return the clutch to engaged position as soon as the transmission gears return to neutral position.

The input shaft 1 is now increased in speed and the input generator 216 will similarly increase in speed. The rapidly increasing voltage difference thus placed between the junction points 245 and 246 will act as a transient by-passing the resistance 251 through the capacitor 254 and thus place the entire potential between the points 245 and 246 across the resistance 252, namely, between the points 233 and 250.

As the armature 263 moves from the point 259 to the point 260, it moves to a point of less potential difference between said armature and the point 233. This time as the voltage difference between the points 245 and 246 becomes greater as the input generator 216 accelerates, the voltage between the points 260 and 233, originating with the input generator 216, will again lead the voltage value which would otherwise be proportional to the speed of said input generator 216 and balance will be attained between the voltage across the resistance 229 and the voltage between the points 233 and 260 slightly ahead of the actual synchronization of the input and output shafts. Attainment of balance between said last-named voltages will again permit current flow through the transistor 289 and energize the switch 303 whereupon it will return rightwardly opposite to the position shown in the drawings.

Here again the output transmission shaft 3 will diminish its speed slightly during the synchronizing operation and the transient thus created will again tend to diminish the voltage across resistance 229. In this case, however, the shaft speeds are approaching each other so that voltage across resistance 229 will merely tend to meet the rising voltage between points 233 and 260 in the same manner as the diminishing of the output rotational speed of the shaft 3 will tend to meet the rising rotational speed of the input shaft 1. Again, the attainment of balance between the above-mentioned voltages will anticipate the attainment of mechanical synchronization in the manner desired and as above described in connection with an upshift.

By way of convenient summary, the following table shows the position of the switch contacts during a shifting operation:

| Condition | 313 | 318 | 307 | 319 |
|---|---|---|---|---|
| Upshift—approaching synchronization. | Open | Closed | Open | Closed. |
| Upshift—at synchronization. | Closed | Open | Closed | Open. |
| Downshift—approaching synchronization. | Closed | Open | Open | Closed. |
| Downshift—at synchronization. | Closed | Open | Closed | Open. |

The resistances 251 and 231 will, respectively, discharge the capacitors 254 and 235 between shifting operations so that there is no residual charge on said capacitors even where shifting operations follow rapidly upon each other.

It will be apparent that the amount by which the shift signal leads the actual attainment of synchronization between the gears being shifted is a function of the capacity of and resistance through the capacitors 254 and 235 as compared to the voltage output of the respective generators. Therefore, these can be readily changed from one model, or type, of transmission to another as needed to fit different uses, or environments of use, and such changes are much easier to bring about than where the sensing of approaching synchronization is carried out by mechanical means.

*Mechanical Shifting Operation*

Turning now to the pressure fluid responsive mechanism and the mechanical operations by which a shifting operation takes place, attention is again called to the fact that the particular shifting apparatus here utilized to illustrate the invention is substantially similar to that illustrated and described in application Serial No. 714,191, assigned to the same assignee as the present invention. However, the apparatus herein described embodies improvements over that appearing in said previous application and accordingly it will be described herein briefly for the purpose of a ready understanding of the present invention.

Assuming first that the vehicle is at a standstill with the engine idling, a pressure will be created at the pressure source S and will pressurize the line 131. However, since each of the valves 133, 134 and 136 is closed, the pressure fluid will stop at these respective valves. Pressure will, however, supply the lines 147, 148 and 149. The clutch will be in disengaged position by depression of the foot pedal by the operator. Since the valve 76 will be held in its rightward position by the spring associated therewith, pressure in line 149 will stop at this valve. As shown, pressure will pass through relay valve 63 to line 151 and thence to line 127 and through selector 111 to line 172. Simultaneously, pressure in line 148 will pass through valve 93 to lines 159 and 161 to the neutral cylinder 46 and energize same to return the gear system to neutral. The larger diameter of the neutral cylinder 46 will enable it to overcome any force exerted by any of the shift cylinders. If as is proper and more likely, the apparatus has been left in neutral position, pressure fluid from selector 111 enters line 178 and moves valve 93 leftwardly. This closes line 148 and prevents energizing of either the clutch or neutral cylinder.

Assuming now, for example, that the selector valve 111 had been last left in the neutral position with the conduit 126 of selector 111 in communication with line 178, the downshift valve 134 will be manually depressed. This energizes the lines 140 and 143 to move the pawl 119 rightwardly against the teeth of the selector 111. This moves the selector 111 counterclockwise one step. This procedure is repeated until the conduit 126 comes into communication with the conduit 172.

The shift valve 136 is now actuated which first supplies pressure fluid through the line 144 and through the pulse valve 97 into the line 104 to move the core of the valve 93 rightwardly if it is not already in rightward position. The core of pulse valve 97 then moves rightwardly as above described in detail for exhausting line 104 through the exhaust port 106.

With the core of valve 93 moved rightwardly, pressure fluid then enters both of the conduits 158 and 161 from the conduit 148. From line 158 the pressure fluid goes through the valve 96 to the conduit 162 and thence to the clutch cylinder 23 for holding the clutch in depressed position. Pressure fluid from the conduit 161 goes to the neutral cylinder 46 and returns the gears to their neutral position. This acts through a crank mechanism 51, above described and the rod 62, to move the core of valve 63 to its leftward position.

Pressure fluid from source line 147 now passes through the relay 63 into line 151 and thence through line 127 to the conduit 125, in the selector 111. From said selector core pressure fluid passes through conduit 126 to the conduit 172 and thence to pressurize shift cylinder 32. However, with pressure fluid still being held on the neutral cylinder 46 which cylinder has a piston 47 of somewhat larger diameter than that of the shift cylinder 32, the force of the neutral cylinder will still predominate and continue to hold the parts in neutral position.

In the normal operation of the vehicle from one shift to another, the synchronizing mechanism operates at this point to de-energize the neutral cylinder and permit the shift cylinder to act.

In shifting from standstill into a starting gear, as first gear, the sequence will be the same as above described for an upshift excepting that with the clutch 19 open the shafts 1 and 3 will both be motionless and hence of "equal" speed. This effects the same balanced condition in the electrical circuit as above described for a synchronized condition. This energizes the switch 303 and effects immediate tripping of the valve 92, which in turn moves the relay 93 leftwardly. This closes the line 148 and thereby de-energizes both of the lines 158 and 161, through the exhaust port of relay 93. De-energizing the line 158 de-energizes the clutch cylinder 23 in order to permit the operator to operate the clutch by the clutch pedal when he is ready. De-energizing the line 161 de-energizes the neutral cylinder 46. This permits the shift cylinder 32 to operate and it moves the rod 17 rightwardly which moves the gear 7 rightwardly into position for engagement with an appropriate countershaft gear. The apparatus is now in first gear position and release of the clutch pedal by the operator will engage the mechanism in the usual manner and the vehicle will commence to move. The shift is now completed.

Assuming now that a shift is to be made from first-to-second position while the vehicle is moving, the operator will first depress the upshift preselect valve 133. This will energize the line 138 which will move the ball 142 downwardly and thereby prevent pressure fluid from said line 138 from entering into the line 143 to actuate the cylinder 117 and it will simultaneously act through the line 146 against the leftward side of the valve 63 to effect rightward movement thereof. This will make sure that the valve 63 is connected to exhaust before shifting sequence is started and thereby insure exhausting of the last previously energized shift cylinder. Simultaneously the pressure from line 138 energizes the cylinder 116 which operates the pawl 118 and thereby moves the selector 111 one increment rightwardly into position for connection of the conduit 126 with the line 173 which in turn is connected to the second shift cylinder 34.

With the shift thus preselected, the shift valve 136 is now depressed by the operator to supply a pulse of air as above described to the line 104 which moves the core of valve 93 rightwardly. Promptly thereafter pressure in line 104 builds up to a point where the core 99 of valve 97 is moved rightwardly whereupon line 104 is connected to the exhaust 106 and the same is depressurized.

As soon as the core of valve 93 moves rightwardly, pressure from the line 148 will pass through the valve 93 into the line 159 and thence into lines 158 and 161. From line 161 pressure fluid flows into the neutral cylinder 46 and urges same toward closed position. However, the interengagement of the gears will prevent actual return of the transmission to neutral position until the clutch is released. Simultaneously, pressure fluid from the line 158 passes through the valve 96 into the line 162 and thence to the clutch cylinder 23. This releases the clutch and the transmission immediately shifts into its neutral position. Return of the transmission to neutral position will bring the plates 38 and 39 into position shown in FIGURE 1 thereby restoring the crank 51 to its vertical position which effects leftward movement of the core valve 63 into position shown in FIGURE 1. Thus, pressure fluid from line 147 energizes line 151 which in turn energizes both of lines 127 and 152. Energizing of the line 152 will energize each of lines 327, 154 and 153. With the clutch disconnected the input shaft 1 diminishes its speed until the electrical synchronizing mechanism signals a desired point slightly ahead of actual synchronism of the gears to be interengaged for the second gear ratio, said signal occurring in the manner above described. When said signal is given, the winding 312 will be energized and the core of trip relay valve 92 will be moved leftwardly against the action of the spring shown therein. This will close the exhaust of said valve and connect line 154 to line 157 through said valve.

Inasmuch as an upshift is at present being considered, the shaft 1 is diminishing in its speed so that the potential difference between the points 245 and 246 is diminishing. This creates a change in potential between the points 265 and 266 which is applied across the rectifier 284 and the switch winding 282, the rectifier being sensed to permit such a pulse to pass. This energizes the switch 283 and moves the armature thereof to connect the contacts 318. As soon as the pressure builds up in line 327 sufficiently to compress the spring 326, the switch 323 closes and energizes the winding 84. This actuates the countershaft brake relay 76 which permits pressure fluid to flow from the line 149 into the line 79 and thus to the cylinder 26 of the countershaft brake 24. Thus, said countershaft brake is applied and the input shaft 1 is slowed rapidly in a known manner and for well-known purposes.

As soon as the synchronization signal is given by the electrical system the winding 302 is re-energized and the switch 303 shifts position to close contacts 307 and open contacts 319. This connects the source P to the winding 312 of the valve 92 to shift same leftwardly. Line 154 having been previously energized, this now energizes line 157 which in turn moves the core of valve 93 leftwardly. This de-energizes the line 159 by connecting same to exhaust and thereby de-energizes both of the lines 158 and 161 which in turn deenergizes the clutch cylinder 23 and the neutral cylinder 46. With the de-energizing of the neutral cylinder 46 and the pressure already on the second ratio shift cylinder 32, the shift into second gear takes place very quickly. Opening contacts 319 of switch 303 de-energizes winding 84 of brake valve 76. The core of brake valve 76 thus is permitted to respond to the spring 83 and move rightwardly, thus de-energizing the countershaft brake 26 simultaneously with activating the trip valve 92. In this embodiment, the relatively long line 162 acts as a restrictor which insures that the clutch will re-engage after the shift is completed and the countershaft brake released but if necessary a restrictor can be supplied.

The system is now de-energized excepting for the lines directly connected with the source "S" and the shift into second gear is completed.

Further shifts into progressively higher ratios may continue in the same manner as above described for the shift from first to second and further detailing thereof is unnecessary and may be omitted.

Turning now to the downshift sequence, and assuming that the apparatus is in its second gear position, the operator will first depress the downshift preselect valve 134 which will provide a supply of pressure fluid to the line 140 and from this line in turn into the valve 141 and line 143. With pressure fluid supplied to the lower side of the valve 141, the ball 142 will move upwardly into the position shown and prevent pressure fluid from entering the line 139. The pressure fluid in the line 143 will actuate the cylinder 117 to move the selector 111 counterclockwise by which to bring conduit 126 into register with the conduit 172. Simultaneously pressure fluid will pass from the valve 141 into the conduit 146 to the valve 63 to urge the core of said valve rightwardly. Since the transmission is not in neutral position, the core will move rightwardly, if it is not already in such position, insuring that pressure fluid in the line 147 will not be introduced into the line 151 until the proper time.

When the operator is ready to effect the shift, he depresses the shift valve 136 which supplies pressure fluid to the line 144 and thence as above described through the pulse valve 97 into the line 104 to move the core of the valve 93 rightwardly into the position as shown. As pressure builds up in the line 104, it moves the core 99 of the valve 97 rightwardly and the line 104 exhausts in the manner above described.

With the core of valve 93 moved rightwardly, pressure in the line 148 passes through the valve 93 into the line 159 and thence into lines 158 and 161. With the valve 96 in the rightward position due to action of the spring positioned therein, pressure on the line 158 passes through said valve 96 into the line 162 and thence to the clutch cylinder 23 to actuate same and to release the clutch 19. At the same time pressure fluid in the line 161 energizes the neutral cylinder 46 which returns the transmission into neutral position as soon as said clutch is released.

This being a downshift, wherein the armature 263 has moved counterclockwise, and the input generator is running slower than it will at the synchronizing point, the polarity of the potential between points 265 and 266 is reversed and the potential created thereby is of such polarity as to be blocked by the rectifier 284. This leaves the solenoid winding 282 de-energized. Thus, electrical energy from the electrical source P will pass the contacts 313 of the switch 283 and energize the winding 317 which will move the core of said valve 91 leftwardly against the spring therein. With the energizing of the line 152 upon attaining neutral position, pressure fluid from said line will pass through line 153 thence through said valve 91 to line 156 and finally to the rightward side of valve 96 which will be caused to move leftwardly to close the communication between lines 158 and 162. This will de-energize the clutch cylinder 23 and open same to the atmosphere, resulting in re-engagement of the clutch immediately upon re-attainment of neutral position.

Attainment of neutral position by the transmission effects leftward movement of the core of valve 63 as above described. This energizes lines 151 and 127 and this acts through the passageway of the selector 111 to energize line 171. This energizes the shift cylinder 32, but response to such energization is prevented so long as neutral cylinder 46 remains energized in view of the larger diameter of said cylinder and the greater force exerted thereby.

With the increasing speed of input shaft 1, the electrical system will presently give a synchronizing signal as above described which results in the re-energizing of the winding 302 and shifting the armature of the switch 303 rightwardly. This will connect the electrical source P through the contacts 307 to the winding 312 of the trip valve 92 and cause same to move against the spring into a position opposite from that shown in the drawings. With the line 152 already energized as above described, this will energize the line 157 which will effect leftward movement of the core of valve 93. Such leftward movement terminates connection between the line 148 and the line 159 which de-energizes both of lines 158 and 161. Since the valve 96 is already closed, the de-energizing of line 158 changes nothing. However, the de-energizing of line 161 de-energizes the neutral cylinder 46 and permits same to exhaust through the line 159 and the exhaust port of said valve 93.

With the de-energization of said neutral cylinder, the pressure which is already on the shift cylinder 32 acts and causes the shift rod 17 to move rightwardly by which the gear 7 is moved into the low-ratio position. With the movement of the gear 7 into its low-ratio position, the plate 39 moves rightwardly and again permits clockwise rotation of the crank member 51 when the line 146 is energized at the beginning of the next shift. The clutch being already connected, the shift is now completed.

Other downshift sequences follow the same procedure as that described for the shifting from second to first and will be readily understood without further description.

The reverse shift proceeds in a manner similar to that above described for shifting into first from neutral and will be readily understood by reference to such description and further description is unnecessary, excepting only to mention that same is accomplished when pressure fluid in the shift cylinder 31 causes the shift rod 17 to move leftwardly and thereby engage the low gear 7 with a conventional reverse gear system including the countershaft gear R.

It will be apparent that the amount by which the shift signal leads the actual attainment of synchronization between the gears being shifted is a function of the capacity of, and resistance through, the capacitors 254 and 235 as compared to the voltage output of the respective generators. Therefore, these can be readily changed from one model or type of transmission to another as needed to fit different uses or environments of use and such changes are much easier to bring about than where the sensing of approaching synchronization is carried out by mechanical means. Further, it is entirely within the contemplation of the invention that such capacitors be made variable, either for adjustment at the factory, for adjustment by a service mechanic and subsequent locking into position, or for adjustment by the driver through a suitable control located in the cab of the vehicle. In all cases, the amount by which the synchronization signal precedes actual synchronization can be adjusted as desired to meet the circumstances of use, a given installation or, in the latter two above-named cases, to meet the desires of the individual operator.

Further, it will be understood that a given shift signalling device can be adapted in the manufacturing operation to use with transmissions having different gear ratios merely by changing the values of the resistances between the several taps on the resistance 252. Where the several leads to the points 256 to 261, inclusive, are merely taps from a single resistor, this will mean only that said taps are taken from different points. Thus, the system is extremely easy to adapt in the manufacturing operation for installation with transmissions of varying gear ratios as compared to a mechanical system wherein such adaptation requires changing and often completely reorganizing the mechanical speed comparing parts.

Though not an essential part of the invention, operation of the apparatus will be improved by using high speed valves, which include capacitor by-passes 341 and 342 for the line resistors 343 and 344. Thus, the initial pulses will by-pass said resistances to secure quick action but said resistances will still act to protect the solenoid windings during continuing energization.

The voltage doubling portions of the circuit, while advantageous, can be omitted if desired by suitable strengthening of the generators or by providing more amplification at the point of the present transistor 289.

Other changes in the parameters of the circuit to meet varying operating conditions and requirements can be readily made, and in the light of the foregoing the changes required to meet particular operating conditions will be evident to anyone skilled in the trade.

Although a particular preferred embodiment of the invention has been disclosed above in detail for illustrative purposes, it will be understood that variations or modifications of such disclosure, which do not depart from the scope of the appended claims, are fully contemplated.

What is claimed is:

1. A control device for use in initiating the shifting of a first shiftable toothed element with respect to a second toothed element interengageable therewith, comprising in combination: means developing a first electrical condition having a comparable characteristic and same being proportional to the rate of rotation of said first toothed element and means developing a second electrical condition having a characteristic comparable to that of said first electrical condition and proportional to the rate of rotation of said second toothed element; means comparing said first electrical condition with said second electrical condition and including means altering one of said electrical conditions with respect to the other of said electrical conditions as the value of said one electrical condition approaches the value of said other electrical condition, whereby said electrical conditions will attain a predetermined ratio with respect to each other prior to the attainment of synchronization between said toothed elements; and means responsive to the attainment of said predetermined ratio between said first and said second electrical conditions for initiating shifting of said first shiftable toothed element into engagement with said second toothed element.

2. A control device for controlling the shifting of first and second interengageable, relatively shiftable toothed elements, comprising in combination: means developing a first electrical potential proportional to the rate of rotation of said first toothed element and means developing a second electrical potential proportional to the rate of rotation of said second toothed element; means modifying the first potential in a manner to increase same to a first value above a value lineally proportional to the rate of rotation of the first toothed element when said first toothed element is increasing speed with respect to said second toothed element and to diminish same to a second value below a rate lineally proportional to the rate of rotation of said first toothed element when said first toothed element is decreasing in speed as compared to said second toothed element; means comparing said first potential, as modified by said modifying means, with said second potential; and means reacting to the attainment of a predetermined ratio between said modified first potential and said second potential for initiating the shift operation.

3. A control device for use with a set of interengageable, relatively shiftable toothed elements having an input shaft and an output shaft, comprising in combination: means developing an electrical potential proportional to the rate of rotation of the input shaft and means developing an electrical potential proportional to the rate of rotation of the output shaft; means modifying at least one of said potentials to diminish the differential therebetween; a comparator circuit receiving said modified potentials and providing a signal when said modified potentials attain a predetermined ratio with respect to each other; means responsive to said signal for initiating shifting of said toothed elements; whereby said signal will be given slightly prior to the attainment of actual synchronization between the toothed elements to be engaged and said toothed elements will accordingly commence their movement toward each other slightly ahead of the point of exact mechanical synchronization therebetween.

4. The device defined in claim 3 wherein said modifying means alters the magnitude of one potential toward the magnitude of the other potentials.

5. The device defined in claim 3 wherein said modifying means is a capacitor and said comparator circuit is a resistance, said capacitor and said resistance being in series with each other and being connected to receive said modified potentials.

6. The device defined in claim 5 including also a resistance connected in shunt around said capacitor whereby said capacitor may be discharged between shifting operations.

7. A control device for initiating the shifting of a transmission having a plurality of alternately engageable sets of relatively shiftable toothed elements, said transmission having an input shaft and an output shaft, comprising in combination: a first voltage-creating device operatively related to said input shaft for creating a voltage proportional in magnitude to the rate of rotation of said input shaft; a second voltage-creating device operatively related to said output shaft for creating a voltage proportional in magnitude to the rate of rotation of said output shaft; a comparator circuit including resistance circuitry for comparing said voltages, said resistance circuitry including a plurality of resistance elements selectively connectible into said comparator circuit in increments corresponding to the successive speed ratios between the input and output shafts of the transmission established by said sets of toothed elements in order that when a given set of toothed elements is engaged said resistance circuitry will compensate for the differences in speed between said input and said output shafts and the voltages applied to said comparator circuit will be equal when the speeds of a selected set of toothed elements are equal; means operatively associated with said resistance circuitry for modifying the voltages applied to said comparator circuit in such a direction as to diminish the differential therebetween; and mechanical means for selecting the resistance elements corresponding to the ratio into which the shift is being made at the beginning of the shifting procedure; whereby the voltage applied to the comparator circuit will vary in a direction toward becoming equalized as said input and output shafts vary in rotational speed toward the point where the set of toothed members to be engaged are synchronized and in response to the action of said modifying means said voltages as applied to said comparator circuit will become equalized slightly before said set of toothed members reach a state of synchronization; and means responsive to a condition of voltage equalization in the comparator circuit for initiating shifting of said set of toothed elements toward each other.

8. In a device for detecting a condition of relative speed between a pair of interengageable, relatively shiftable elements and for initiating movement of said elements toward each other upon attainment of a predetermined condition of relative speed therebetween, the combination comprising: a first voltage-creating device operatively associated with one of said elements for creating a voltage proportional in magnitude to the speed of said one element; a second voltage-creating device operatively associated with the second of said elements for creating a voltage proportional in magnitude to the speed of rotation of said second element; a pair of junction points; circuitry connecting one side of said first voltage-creating device to one of said junction points; a resistance and circuitry connecting the other side of said first device through said resistance to the other of said junction points; a capacitor and means connecting same in series with the resistance but out of the circuit of said first voltage-creating device; circuitry connecting the respective sides of said other voltage-creating device to opposite ends of the series circuit formed by said resistance and said capacitor and in the same polarity with respect to the polarity applied thereto by said first-named voltage-creating device; and conductive means including a further resistance connected around said capacitor; means responsive to a predetermined potential condition between said junction points for initiating shifting of said transmission.

9. In a transmission having an input shaft and an output shaft and a plurality of sets of meshable speed ratio gears operatively arranged therebetween, shift initiating means comprising in combination: a first voltage-creating device operatively associated with the input shaft of said transmission for creating a voltage proportional in magnitude to the speed of rotation of said input shaft; a second voltage-creating device operatively associated with said output shaft for creating a voltage proportional in magnitude to the speed of rotation of said output shaft; a pair of junction points and circuitry connecting one side of said second device to one of said junction points; a comparator circuit including a plurality of serially connected balance resistances, said balance resistances being proportional to the speed ratios in said transmission, a resistance and a capacitor in parallel and connected to the end of said series connected balance resistances to form a series circuit therewith; means connecting the other side of said second voltage-creating device through a selected portion of said balance resistance to the other junction point, said selected portion bearing to the total resistance of said series connected balance resistances a ratio inverse to the speed ratio of the input and output shafts established by the next set of gears to be engaged; means connecting one side of said first voltage-creating device to one end of said last-named series circuit and the other side of said first voltage-creating device to the other end of said series circuit, the polarity of said voltage-creating devices being such that the potentials applied thereby on the said balance resistance oppose each other; and means responsive to a predetermined condition of potential difference between said junction points for initiating shifting of a selected set of toothed elements in said transmission into mesh with each other.

10. A control device for use in intiating the shifting of a first shiftable toothed element with respect to a second toothed element which is interengageable therewith, comprising: means for developing a first electrical condition having a comparable characteristic, which characteristic is proportional to the rate of rotation of the first toothed element; means for developing a second electrical condition having a characteristic comparable to that of said first condition, said characteristic of said second condition being proportional to the rate of rotation of said second toothed element; means for altering said characteristics with respect to each other so that the changing relationship between said altered characteristics leads the changing relationship between the rates of rotation of said toothed elements when said rates of rotation are changing with respect to each other; means for comparing said altered characteristics and providing a signal when said altered characteristics bear a relationship to each other indicating that said toothed elements are approaching and are close to exact synchronization whereby said signal may initiate shifting of said elements into interengagement so that said elements can be interchanger substantially at exact synchronization.

11. A control device according to claim 10 in which said comparable characteristic is voltage and in which said means for altering said characteristics includes resistance means and capacitance means connected in series with each other and having one of the voltages applied thereacross, the capacitance means serving to diminish the voltage drop across the resistance means when said one voltage is changing in one direction and serving to increase the voltage drop across the resistance means when said one voltage is changing in the opposite direction.

12. A transmission shifting control for a transmission having an input shaft, an output shaft and a plurality of alternately engageable sets of gears for establishing selected speed ratios between said shafts, comprising: first generating means for developing an electrical supply potential proportional to the rate of rotation of the input shaft; second generating means for developing an electrical supply potential proportional to the rate of rotation of the output shaft; modifying means for receiving said supply potentials and modifying same with respect to each other by an amount proportional to the speed ratio next to be established to provide resultant potentials, said modifying means also including advance means for advancing at least one of said resultant potentials with respect to its supply potential so that it leads same whether said supply potential is increasing or decreasing, whereby said resultant potentials reach predetermined relative values when the set of toothed elements next to be engaged are approaching synchronization; means for comparing said resultant potentials and giving a shifting signal when same reach said predetermined relative values.

13. A transmission shifting control according to claim 12 in which said generating means are alternating current generators and including full wave rectifying means for converting the outputs thereof into substantially constant, direct current potential.

14. A transmission shifting control according to claim 12 in which said modifying means includes advance means for advancing both of said resultant potentials with respect ot their supply potentials.

15. A transmission shifting control according to claim 12 wherein said advance means is a capacitor.

16. A transmission shifting control according to claim 12 in which said means for giving a shifting signal includes a semi-conductor device.

17. A transmission shifting control for a transmission having an input shaft, an output shaft and a plurality of alternately engageable sets of gears for establishing selected speed ratios between said shafts, comprising: first generating means for developing an electrical supply potential proportional to the rate of rotation of the input shaft; second generating means for developing an electrical supply potential proportional to the rate of rotation of the output shaft; a series circuit comprising resistance circuitry and a capacitance connected to said first generating means, said resistance circuitry comprising a group of resistance sections, selectable tap means and an armature alternately engageable with said tap means for establishing between one end of said resistance circuitry and said armature selectable resistances which respectively bear the same ratios to the entire resistance of said resistance circuitry as does the speed of the output shaft bear to the speed of the input shaft when the respective sets of gears are engaged; resistance means connected to the second generating means; a comparing circuit having two terminals, means connecting said one end of said resistance circuitry to one end of said resistance means, means connecting the other end of said resistance means to one of said terminals and means connecting said armature to said other terminal; and means for giving a shifting signal in response to a predetermined potential difference between said terminals.

18. The device defined in claim 17 wherein said group of resistance sections are serially connected to each other.

19. A transmission shifting control according to claim 17 in which said comparing circuit includes a rectifier bridge in which said two terminals are the input terminals, said bridge also having two output terminals; an electronic relay device having principal electrodes and a control electrode and means connecting one of said principal electrodes and said control electrode to said output terminals whereby the condition of conductivity of said device is controlled by the potential difference between said input terminals.

20. A transmission shifting control according to claim 17 in which said comparing circuit includes a rectifier bridge in which said two terminals are the input terminals, said bridge also having two output terminals; a solid state electronic relay device having principal electrodes and a control electrode and means connecting one of said principal electrodes and said control electrode to said output terminals whereby the condition of conductivity of said device is controlled by the potential difference between said input terminals.

References Cited in the file of this patent

UNITED STATES PATENTS

| | | |
|---|---|---|
| 2,943,502 | Perkins et al. | July 5, 1960 |
| 2,943,719 | McNamara et al. | July 5, 1960 |